(12) United States Patent
Lange

(10) Patent No.: US 10,773,213 B2
(45) Date of Patent: Sep. 15, 2020

(54) FILTRATION APPARATUS

(71) Applicant: Veolia Water Solutions & Technologies Support, Saint-Maurice (FR)

(72) Inventor: Neville Ernest Lange, Gloucestershire (GB)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 514 days.

(21) Appl. No.: 14/402,112

(22) PCT Filed: May 23, 2013

(86) PCT No.: PCT/EP2013/060647
§ 371 (c)(1),
(2) Date: Nov. 19, 2014

(87) PCT Pub. No.: WO2014/009047
PCT Pub. Date: Jan. 16, 2014

(65) Prior Publication Data
US 2015/0144555 A1 May 28, 2015

(30) Foreign Application Priority Data

May 23, 2012 (GB) .................................. 1209327.4

(51) Int. Cl.
*B01D 63/06* (2006.01)
*B01D 63/04* (2006.01)
(Continued)

(52) U.S. Cl.
CPC ............. *B01D 63/06* (2013.01); *B01D 29/52* (2013.01); *B01D 63/046* (2013.01);
(Continued)

(58) Field of Classification Search
None
See application file for complete search history.

(56) References Cited

U.S. PATENT DOCUMENTS 4,522,717 A * 6/1985 Brust ................. B01D 19/0031
210/238
4,671,809 A * 6/1987 Taketomo .............. B01D 53/22
55/523

(Continued)

FOREIGN PATENT DOCUMENTS

DE 4140058 A1 6/1993
JP 60007916 1/1985
(Continued)

OTHER PUBLICATIONS

Wenzlaff et al., "Machine Translation of DE4140058A1", published 1993, 15 total pages.*

(Continued)

*Primary Examiner* — Jonathan M Peo
(74) *Attorney, Agent, or Firm* — Coats & Bennett PLLC

(57) ABSTRACT

A filtration apparatus (10) for treating a fluid comprises a vessel (12), a first partition plate (18) dividing the vessel into first and second chambers (22, 26) and defining a through hole (40), and a filtration module (30) located within the second chamber (26) and including a body section (32) defining an outer diameter which is greater than the diameter of the through hole (40) in the first partition plate (18). The apparatus (10) further comprises a reducing connector (36) having a first end secured to the body section (32) of the filtration module (30) and a second end sealed relative to the through hole (40) in the first partition plate (18) to permit communication between the filtration module (30) and the first chamber (22).
In a disclosed embodiment the apparatus (10) includes a second partition plate (20) such that the vessel is divided into first, second and third chambers (22, 24, 26), wherein the filtration module (30) is mounted between the partition plates (18, 20).

31 Claims, 3 Drawing Sheets

(51) Int. Cl.
- *B01D 65/02* (2006.01)
- *B01D 65/08* (2006.01)
- *B01D 65/00* (2006.01)
- *B01D 29/52* (2006.01)

(52) U.S. Cl.
CPC ........... *B01D 63/061* (2013.01); *B01D 65/00* (2013.01); *B01D 65/02* (2013.01); *B01D 65/08* (2013.01); *B01D 2201/043* (2013.01); *B01D 2201/0453* (2013.01); *B01D 2313/02* (2013.01); *B01D 2313/13* (2013.01); *B01D 2313/20* (2013.01); *B01D 2313/26* (2013.01); *B01D 2317/04* (2013.01); *B01D 2321/02* (2013.01); *B01D 2321/04* (2013.01); *B01D 2321/16* (2013.01); *B01D 2321/18* (2013.01); *B01D 2321/185* (2013.01); *Y10T 29/49826* (2015.01)

(56) References Cited

U.S. PATENT DOCUMENTS

| | | | |
|---|---|---|---|
| 4,728,423 A * | 3/1988 | Kuwajima | B01D 29/114 210/323.2 |
| 5,167,676 A | 12/1992 | Nakaishi et al. | |
| 5,238,576 A | 8/1993 | Affonso | |
| 5,484,528 A * | 1/1996 | Yagi | B01D 63/02 210/232 |
| 5,525,220 A | 6/1996 | Yagi et al. | |
| 5,601,710 A * | 2/1997 | Yoon | B01D 29/114 210/232 |
| 5,637,214 A | 6/1997 | Kahana | |
| 6,358,422 B1 | 3/2002 | Smith et al. | |
| 6,398,951 B1 | 6/2002 | Smith et al. | |
| 6,398,966 B1 | 6/2002 | Smith et al. | |
| 7,105,090 B2 | 9/2006 | Choo | |
| 2006/0011535 A1 | 1/2006 | Ikeda | |
| 2011/0024342 A1 * | 2/2011 | Fujita | B01D 63/065 210/184 |

FOREIGN PATENT DOCUMENTS

| | | |
|---|---|---|
| JP | 10094712 | 4/1998 |
| JP | 2009082761 | 4/2009 |
| WO | 03/090911 A1 | 11/2003 |
| WO | 2012/004304 A2 | 1/2012 |

OTHER PUBLICATIONS

Ciu, Datong et al., "Fruit and Vegetable Processing Machinery", Beijing Agricultural University Press, First Ed, pp. 65-66 (Dec. 1993).

* cited by examiner

FILTRATION APPARATUS

This application is a U.S. National Stage Application of PCT Application No. PCT/EP2013/060647, with an international filing date of 23 May 2013. Applicant claims priority based on United Kingdom Patent Application No. 1209327.4 filed 23 May 2012. The subject matter of these applications is incorporated herein.

FIELD OF THE INVENTION

The present invention relates to a filtration apparatus, and in particular to a filtration apparatus which includes one or more filtration modules contained within a vessel.

BACKGROUND TO THE INVENTION

Filtration is well known for the treatment of fluids, such as water, and is typically achieved by use of appropriate filtration media, such as filtration membranes. A conventional arrangement for housing and utilising filtration membranes is to arrange each membrane unit (hereafter called a "module") into its own pressure containing housing which has suitable connections to allow filtration and cleaning cycles to be performed on the membrane. Although such modules may be provided in numerous sizes, for illustrative purposes a larger module may be around 250 mm in diameter, around 2000 mm long, and may contain around 100 $m^2$ of membrane surface. A typical operation flux may be 60 LMH (litres per hour per $m^2$ of membrane surface) which means the flow of a large module may be 6 $m^3/h$. Where larger flows must be filtered these modules are usually connected to manifolds so that many modules are operated in parallel. Typical applications where large flows must be treated may include filtering seawater or brackish water prior to a reverse osmosis process to produce fresh drinking water or process water, and filtering seawater prior to a nanofiltration process used to remove particular ionic species from the water prior to injection into oil reservoirs. These applications may require flows of up to 1000-3000 $m^3/h$ which would require 150 to 450 of these large modules, and would require an even larger number of smaller modules.

It has been proposed in the art to include multiple membrane modules within a common filtration vessel or tank, wherein a single feed of raw fluid is delivered to the vessel which may then be treated by all modules within the vessel. This may minimise infrastructure, such as individual module pressure housings, manifolds, valves and the like, and may minimise the footprint of the filtration system.

U.S. Pat. Nos. 5,209,852 and 7,083,726 each disclose a filtration vessel containing multiple membrane modules suspended from a partition plate, wherein the partition plate divides the vessel into lower and upper compartments. During use, the lower compartment receives and contains raw water at the required filtration pressure, and the upper compartment accommodates filtered water which has passed from the lower compartment through the individual membrane modules. The partition plate must isolate the upper and lower chambers and be of sufficient integrity to accommodate the pressure differential therebetween.

In known filtration vessels with multiple modules, such as disclosed in the prior art documents mentioned above, each module is mounted in respective holes formed in the partition plate, wherein the holes accommodate the full outer diameter or width of the modules. Accordingly, the size and number of the holes can significantly weaken the plate and as a result partition plates are typically formed to be relatively thick, which can increase the cost of the vessels, particularly where expensive materials, such as titanium, are required, for example to resist corrosive chemicals which may be present in the vessel.

Furthermore, as the individual holes in a partition plate are dimensioned to accommodate the full width of the filtration modules, the required sealing area to maintain isolation between upper and lower chambers can also be relatively large, increasing the potential risk of leakage between chambers.

The efficiency of filtration media such as membranes will reduce over time due to fouling, which typically results in an increase in the pressure drop across the media. Such fouling is addressed by cleansing processes, usually on a cyclical basis, to maintain efficient operation.

In a typical application of filtering seawater using membrane media, a membrane may need to be frequently cleaned, for example every 30 to 90 minutes to maintain its filtration capacity. It has been found that a quick clean, for example of around 1 to 3 minutes involving only physical cleaning mechanisms can be effective in recovering most of the pressure drop increase which has occurred. This clean can be referred to as a type 1 clean. However this type 1 clean does not fully clean the membrane and as such there is a slow increase in the pressure drop across the "cleaned" membrane.

After typically 18 to 48 hours a longer clean involving chemical cleaning mechanisms is generally employed to recover the "cleaned" membrane pressure drop that the type 1 clean may not be capable of recovering, and/or to disinfect the membrane to prevent growth of bacteria which can also foul the membrane. This clean can be referred to as a type 2 clean.

A type 2 clean, however, typically still does not fully clean the membrane, such that over a longer period of perhaps 2 weeks to 2 months another type of cleaning of greater thoroughness and even longer duration or cost is required. This clean can be referred to as a type 3 clean A type 1 clean tends to use physical cleaning mechanisms which can be achieved by the operation of valves that cause changes in flowrate, flow direction, or fluids in the module.

Type 2 and 3 cleaning are generally similar to each other and typically include the use of chemicals. However, a type 2 clean usually employs fewer steps and is of shorter duration than a type 3 clean, such that the membrane modules are out of service for less time.

It is common for a type 1 clean to be performed before and/or after a type 2/3 clean.

Although many cleaning processes exist, it is often the case that a filtration apparatus is only capable of supporting a very limited range of these. For example, in known filtration apparatus which include multiple modules suspended from a partition plate in a vessel, it is generally not possible to flow or wash through the modules in reverse directions simultaneously, for example to perform both back and forward washing. This is because the lower chamber would contain both the water to be introduced into a feed side of the modules, and also the dirty water which has been backwashed through the modules.

Furthermore, certain cleaning operations may utilise the bubbling of a gas through the modules to agitate or scrub the filtration media and dislodge particulate and other matter. In known vessel based systems gas nozzles are located within the lower chamber generally below a respective filtration module, such that gas exiting the nozzles rises towards, into and through each module. However, as the modules will require to be filled with water to permit the bubbles to have the desired effect, then the lower chamber must be filled, and it is likely that a degree of turbulence within the lower chamber will exist. This may disturb the gas exiting the nozzles which may result in an uneven distribution of gas into the modules.

Further, in the known vessel based systems with multiple modules, cleaning times may be extended in that for many cleaning processes the entire lower chamber will need to be drained.

SUMMARY OF THE INVENTION

An aspect of the present invention relates to a filtration apparatus for treating a fluid, comprising:
a vessel;
a first partition plate dividing the vessel into first and second chambers and defining a through hole;
a filtration module located within the second chamber and including a body section defining an outer width which is greater than the width of the through hole in the first partition plate; and
a reducing connector having a first end secured to the body section of the filtration module and a second end sealed relative to the through hole in the partition plate to permit communication between the filtration module and the first chamber.

Accordingly, by virtue of the through hole width in the partition plate being smaller than that of the body section of the filtration module, and by use of the reducing connector to facilitate a sealed cooperation between the filtration module and the through hole, the strength of the partition plate may not be compromised to the same extent as in prior art arrangements. Furthermore, the strength of the partition plate may be preserved without compromising on the size, and thus capacity, of the filtration module. Also, the smaller dimensioned through hole may permit a thinner partition plate to be utilised.

Further, as the reducing connector is sealed relative to the through hole in the partition plate, the first and second chambers may be isolated from each other. Also, the required sealing area between the reducing connector and the through hole may be reduced relative to prior art arrangements by virtue of the through hole width in the partition plate being smaller than that of the body section of the filtration module.

The through hole in the partition plate may be considered to be an aperture which extends from one side of the plate to the other. The through hole may define any suitable shape or profile, such as round, oval or the like. In this respect it should be understood that the term "diameter" and other similar terms which may be used herein in relation to any feature defined are used for convenience and are not intended to be limited only to circular profiles. For example, a diameter may be equivalent to a width.

In use, a fluid to be treated, such as seawater, may be driven through the filtration module to be filtered therein, with filtered fluid, or permeate, exiting the filtration module via the reducing connector to subsequently flow into the first chamber. Permeate may then be drawn from the first chamber to exit the vessel and be passed for appropriate use and/or further treatment.

The reducing connector may define a permeate outlet of the filtration module.

The apparatus may be configured to accommodate reverse flow of fluid from the first chamber and into the filtration module, for example to perform a backwashing cleaning operation. In such an operation fluid, for example previously filtered fluid, may be driven from the first chamber and into the filtration module via the reducing connector.

The apparatus may be configured to accommodate flow of a gas from the first chamber and into the filtration module, for example to perform a cleaning operation within the filtration module.

The reducing connector may form part of the filtration module and be secured or formed with the body section to define a single unit.

The reducing connector may comprise a first portion, for example a cylindrical portion, for securing to the body section of the filtration module. The reducing connector may comprise a second portion, for example a cylindrical portion, which defines a smaller width than the first portion and which is sealed relative to the through hole. The reducing connector may comprise a tapered portion extending between the first and second portions. The reducing connector may be provided in the form of a funnel, for example.

The reducing connector, for example a first portion of the reducing connector, may be secured to the body section of the filtration module by a threaded arrangement, adhesive bonding, welding, interference fitting, integrally forming or the like, or any suitable combination thereof.

The reducing connector, for example a first portion of the reducing connector, may be sealed relative to the body section of the filtration module. Sealing may be achieved via one or more sealing members, by virtue of the connection mechanism, or the like.

The reducing connector may be sealed relative to an internal surface of the through hole.

The reducing connector may be sealed relative to a peripheral area or region of the through hole. For example, the reducing connector may cover or superpose the through hole and be sealed relative to a surface of the partition plate around the periphery of the through hole.

The reducing connector, for example a second portion of the reducing connector, may be sealed relative to the through hole in the partition plate via a sealing arrangement.

The sealing arrangement may be defined by direct engagement between the connector and the partition plate. The sealing arrangement may comprise or be defined by one or more seal bodies, such as o-rings or the like. The sealing arrangement may be defined by a connection mechanism used to connect the reducing connector to the partition plate.

The sealing arrangement may be interposed between the reducing connector and an internal surface of the through hole.

The sealing arrangement may be interposed between the reducing connector and a face of the partition plate, for example around the periphery of the through hole.

The reducing connector, for example a second portion of the reducing connector, may extend into the through hole in the partition plate. In such an arrangement a sealing arrangement may be provided between an outer surface of the reducing connector and an inner surface of the through hole.

The reducing connector, for example a second portion of the reducing connector, may abut against a face of the first partition plate. In such an arrangement the sealing arrangement may be provided between the reducing connector and the face of the partition plate, for example around the periphery of the through hole.

The reducing connector, for example a second portion of the reducing connector, may be secured to the first partition plate. Such an arrangement may mechanically secure the filtration module to the first partition plate. The reducing connector may be secured to the first partition plate by a threaded arrangement, adhesive bonding, welding, interference fitting, integrally forming or the like, or any suitable combination thereof.

The reducing connector, for example a second portion of the reducing connector, may be secured to the partition plate by a bolt arrangement. In one embodiment a bolt may extend from one side of the partition plate to engage the reducing connector on the opposite side of the partition plate. The bolt may fasten or clamp the reducing connector against the partition plate. The bolt may extend through the through hole in the partition plate.

In one embodiment the bolt may define an axial through bore such that when the bolt is connected with the reducing connector fluid communication through the through bore of the bolt is permitted. Accordingly, fluid communication between the filtration module and the first chamber within the vessel may be achieved via the through bore in the bolt. The bolt may define a quill type bolt.

The filtration module may comprise one or more filtration membranes. For example, the filtration module may comprise one or more of micro-filtration membranes, ultra-filtration membranes, nano-filtration membranes and/or reverse osmosis membranes.

The filtration module may be configured for cross-flow type filtration of fluid.

The filtration module may be configured for dead-end type filtration of fluid.

The filtration module may define a fluid inlet for receiving fluid to be filtered. The fluid inlet may be defined at one end of the filtration module, for example opposite the reducing connector. The fluid inlet may be defined across a surface region of the filtration module, for example across a surface of a filtration membrane mounted in the filtration module.

The filtration module may comprise an outer shroud. The reducing connector, for example a first portion of the reducing connector, may be secured to the shroud. The shroud may define any suitable profile, such as round, oval, polygonal or the like.

The shroud may comprise or define one or more ports to permit fluid communication between external and internal regions of the shroud. The ports may be arranged to permit communication with the second chamber. For example, the ports may permit fluid within the second chamber to enter the filtration module to be filtered therein. The ports may be configured to permit fluid within the filtration module to exit the filtration module into the second chamber. For example, the second chamber may be filled with a feed fluid, for example during commissioning of the apparatus, by flow initially into the filtration module and then into the second chamber via the one or more ports in the shroud of the filtration module. In some embodiments the ports may permit fluid which has been reverse flowed through the filtration module from the first fluid chamber, for example in a backwashing operation, to enter the second chamber.

One or more ports may be located adjacent the reducing connector. One or more ports may be provided in the reducing connector.

The one or more ports in the shroud may be positioned to permit fluid to be retained within the filtration module, irrespective of the level of any fluid contained within the second chamber. Such an arrangement may permit the filtration module to accommodate a cleaning process using bubbling of a gas through the filtration module. For example, the filtration module, in use, may be arranged in a vertical orientation, and the ports may be located at an upper region of the filtration module. Accordingly, the filtration module may be capable of retaining fluid at least up to the level or height of the ports.

The first partition plate may be sealed relative to the internal surface of the vessel. The first partition plate may be welded to the internal wall surface of the vessel. The vessel may be provided in separate parts and the first partition plate may be clamped between separate parts of the vessel.

The filtration module may be elongate.

The filtration module may be arranged generally vertically within the vessel. In such an arrangement the reducing connector may define an upper region of the filtration module, and the first chamber may be located above the second chamber.

The apparatus may comprise a plurality of filtration modules located within the second chamber. Two or more of the filtration modules may be configured similarly, for example as defined above. All filtration modules may be configured similarly, for example as defined above.

The first partition plate may define a plurality of through holes, and the apparatus may comprise a plurality of filtration modules each associated with a respective through hole, for example in the same manner as defined above.

The apparatus may comprise a second partition plate, such that the first and second partition plates divide the vessel into first, second and third chambers. The first and second partition plates may be arranged such that the second chamber is interposed between the first and third chambers.

The second partition plate may be sealed relative to the internal surface of the vessel. The second partition plate may be welded to the internal wall surface of the vessel. The vessel may be provided in separate parts and the second partition plate may be clamped between separate parts of the vessel.

The filtration module may extend between the first and second partition plates. The filtration module may be engaged with the second partition plate. In such an arrangement the filtration module may be supported at opposing ends by the first and second partition plates, thus providing robust support for the filtration module, and also creating a rigid construction of the filtration apparatus.

The second partition plate may define a through hole and the filtration module may be sealed relative to said through hole. An inlet of the filtration module may be sealed relate to the through hole. Such an arrangement may permit communication between the filtration module and the third chamber.

In use, a feed fluid, such as seawater, may be delivered into the third chamber of the vessel, driven from the third chamber and into and through the filtration module to be filtered therein, with filtered fluid exiting the filtration module into the first chamber.

In some embodiments the filtration module may permit fluid communication of feed fluid from the third chamber into the second chamber. In such an arrangement the second chamber may be filled with feed fluid by flow of the fluid from the third chamber via the filtration module.

As noted above, the apparatus may be configured to accommodate reverse flow of fluid from the first chamber and into the filtration module, for example to perform a backwashing cleaning operation.

Reverse flow, which will likely become polluted by material washed from the filtration module, may exit the filtration module into the second chamber. Furthermore, the reverse flow exiting into the second chamber from the filtration module may be isolated from the third chamber, thus preventing fluid within the third chamber becoming contaminated. In this way, during reverse flow, the third chamber may remain filled with feed fluid. In some embodiments, the presence of fluid within the third chamber may prevent any reverse flow entering said chamber, thus achieving appropriate isolation. Isolation of the second and third chambers during reverse flow may eliminate the requirement to drain the volume of the third chamber before reconfiguring the apparatus to operate in a conventional forward filtration mode, thus reducing the time the apparatus is held off-line to perform cleaning.

Reverse flow may exit the filtration module into the third chamber. In such an arrangement the second chamber may remain isolated from the third chamber and thus the contaminated backwashed fluid. As such, the second chamber may not need to be drained.

The arrangement of the apparatus, and in particular the provision of the separate second and third chambers may permit forward washing of the module. For example, a washing fluid may be driven from the third chamber and into the module and flowed across the surface of a membrane contained therein, with the forward washed fluid exiting the module and into the second chamber.

Furthermore, isolation of the second and third chambers during reverse flow may permit the simultaneous forward flow of fluid from the third chamber through or across the filtration module. Such combination of forward and reverse flow may enable more thorough cleaning of the filtration module.

The apparatus may be configured to accommodate flow of a gas from the third chamber and into the filtration module, for example to perform a cleaning operation within the filtration module.

Accordingly, cleaning of the filtration module may be achieved in multiple ways, for example by backwashing, by forward flow, by bubbling gas through the filtration module, or any suitable combination thereof. As such, the provision of first and second partition plates to define three separate chambers within the vessel may permit a greater range of cleaning operation to be performed in comparison to prior art systems.

The through hole in the second partition plate may define any suitable shape or profile, such as round, oval or the like. The through hole in the second partition plate may define a smaller width than the outer width of the filtration module. Accordingly, the dimension of the through hole in the second partition plate may be minimised, providing benefits such as permitting use of a thinner plate and the like.

The apparatus may comprise a further reducing connector having a first end secured to the body section of the filtration module and a second end sealed relative to the through hole in the second partition plate.

The reducing connector sealed relative to the first partition plate and the further reducing connector sealed relative to the second partition plate may be similarly configured.

The further reducing connector may comprise a first portion, such as a cylindrical portion, for securing to the body section of the filtration module. The further reducing connector may comprise a second portion, such as a cylindrical portion which is sealed relative to the through hole in the second partition plate. The further reducing connector may comprise a tapered portion extending between the first and second portions. The further reducing connector may be provided in the form of a funnel, for example.

The further reducing connector, for example a first portion of the further reducing connector, may be secured to the body section of the filtration module by a threaded arrangement, adhesive bonding, welding, interference fitting, integrally forming or the like, or any suitable combination thereof.

The further reducing connector, for example a first portion of the further reducing connector, may be sealed relative to the body section of the filtration module. Sealing may be achieved via one or more sealing members, by virtue of the connection mechanism or the like.

The further reducing connector may be sealed relative to an internal surface of the through hole.

The further reducing connector may be sealed relative to a peripheral area or region of the through hole. For example, the further reducing connector may cover or superpose the through hole and be sealed relative to a surface of the second partition plate around the periphery of the through hole.

The further reducing connector, for example a second portion of the further reducing connector, may be sealed relative to the through hole in the second partition plate via a sealing arrangement.

The sealing arrangement may be defined by direct engagement between the further reducing connector and the second partition plate. The sealing arrangement may comprise or be defined by one or more seal bodies, such as o-rings or the like.

The sealing arrangement may be defined by a connection mechanism used to connect the further reducing connector to the second partition plate.

The sealing arrangement may be interposed between the further reducing connector and an internal surface of the through hole in the second partition plate.

The sealing arrangement may be interposed between the further reducing connector and a face of the second partition plate, for example around the periphery of the through hole.

The further reducing connector, for example a second portion of the further reducing connector, may extend into the through hole in the second partition plate. In such an arrangement a sealing arrangement may be provided between an outer surface of the further reducing connector and an inner surface of the through hole.

The further reducing connector, for example a second portion of the reducing connector, may abut against a face of the second partition plate. In such an arrangement the sealing arrangement may be provided between the further reducing connector and the face of the second partition plate, for example around the periphery of the through hole.

The further reducing connector may be freely mounted relative to the second partition plate. For example, the further reducing connector, such as a second portion of the further reducing connector, may be inserted into the through hole in a manner such that relative movement between the second partition plate and the filtration module is permitted. Such an arrangement may permit a compliant engagement between the filtration module and the partition plate which may accommodate possible effects of deformation of certain components of the apparatus during use, such as due to the effects of pressure, temperature and the like.

The further reducing connector, for example a second portion of the further reducing connector, may be secured to the second partition plate. The further reducing connector may be secured to the second partition plate by a threaded arrangement, adhesive bonding, welding, interference fitting, integrally forming or the like, or any suitable combination thereof.

The apparatus may comprise a tubular member extending from the through hole in the second partition plate into the third chamber. The tubular member may define an open end to facilitate communication of a fluid, such as a feed fluid, from the third chamber into the tubular member. Flow between the third chamber and the filtration module may be achieved via the tubular member. The tubular member, for example one end of the tubular member, may be sealingly engaged with the through hole in the second partition plate. The tubular member may extend partially or fully into or through the through hole. In such an arrangement the tubular member may be considered to define, at least partially, the inner surface of the through hole, such that any reference herein to sealing of an item relative to the inner surface of the through hole of the second partition plate may be deemed to include sealing of the item relative to the tubular member.

At least a portion of the filtration module, for example a portion of a further reducing connector, may engage, for example by being inserted into, the tubular member.

The tubular member may facilitate delivery of a gas from the third chamber into the filtration module, for example for use in a cleaning process. In some embodiments a gas may be introduced into the third chamber during a cleaning operation. For example, during a filtering operation the third chamber may be substantially completely filled with a feed fluid, with gas being introduced into the chamber when cleaning is to be performed. The tubular member may facilitate delivery of a gas from the third chamber into the filtration module when the tubular member and the filtration module are at least partially filled with a fluid, specifically a liquid.

The tubular member may define a port in an outer surface thereof to facilitate communication of gas from the third chamber. The port may be positioned on the tubular member to be positioned within an upper region of the third chamber. Such an arrangement may permit the port to be in communication with a gas space which might be present in an upper region of the third chamber, for example supplied into the third chamber to form a gas space during a cleaning operation.

The port may be positioned at an elevated position above an open end of the tubular member. In use, for example during a cleaning operation, the open end of the tubular member may be located below a liquid level defined in the third chamber which defines a lower boundary of a gas space, and the port may be located above said liquid level, such that communication with a gas in said gas space may be permitted through the port. Gas located above said liquid level may be communicated into the tubular member by virtue of a pressure differential between the gas within the gas space and fluid within the tubular member at the location of the port. For example, a fluid, specifically a liquid, contained within the tubular member will be subject to a hydrostatic pressure which will vary in accordance with its height. Further, the pressure of the gas will be substantially defined by the pressure of the liquid at the liquid level in the third chamber. In this respect, the hydrostatic pressure of the fluid within the tubular member at the location of the port will be lower than that at the liquid level within the third chamber, and thus lower than the pressure of the gas within the third chamber, with the pressure differential being proportional to the height difference between the liquid level and the port. Accordingly, the presence of this differential will facilitate inflow of gas into the tubular member.

The port may be appropriately dimensioned to provide a desired flow rate of gas.

In use, a gas may be communicated into the third chamber by flowing through any liquid contained therein to form a gas space in the top of the chamber. Alternatively, or additionally, a gas may be directly communicated, for example by appropriate pipe work, into a gas space in the chamber, and/or directly into the tubular member via the port.

In some embodiments the apparatus may comprise:

a plurality of filtration modules each sealingly engaged relative to a respective through hole in the second partition plate; and a plurality of tubular members each extending from a respective through hole and into the third chamber.

The tubular members may facilitate distribution, for example even distribution, of a fluid from the third chamber into the filtration modules. For example, the tubular members may facilitate distribution of a feed fluid or a fluid to be treated.

The tubular members may facilitate substantially even distribution of a gas, such a cleaning gas into the filtration modules. For example, each tubular member may include an open end and an elevated port such that gas may be delivered through each port by a common pressure differential.

The vessel may define or comprise one or more ports to permit fluid communication to and/or from the vessel. The apparatus may comprise one or more valves associated with ports on the vessel.

One or more ports on the vessel may have multiple functions. For example, in some embodiments a vessel port may define an outlet when the apparatus is operating in one mode, such as a filtering mode of operation, and may define an inlet when the apparatus is operating in a different mode of operation, such as a cleaning mode of operation. Further, one or more ports may accommodate various fluids, such as a fluid to be treated, a treated fluid, chemicals for cleaning, a gas or the like.

The vessel may define or comprise at least one fluid inlet for communication of a fluid into the vessel, such as a fluid to be treated, a cleaning fluid such as a chemical or a gas, or the like. In some embodiments the vessel may comprise a fluid inlet for communicating a fluid into the third chamber.

The vessel may define or comprise at least one fluid outlet for communication of fluid from the vessel, such as treated fluid, a cleaning fluid, a backwashed fluid or the like. For example, the vessel may comprise a fluid outlet for communicating fluid, such as a treated fluid from the first chamber. The vessel may comprise a fluid outlet for communicating a fluid, such as a backwashed fluid, from the second chamber.

The vessel may define a vent for use in controlling pressure within the vessel, for example within one or more chambers within the vessel. The vent may be selectively opened and closed to permit the vessel to be pressurised, depressurised, drained, filled and the like.

An aspect of the present invention relates to a filtration apparatus for treating a fluid, comprising:

a vessel;

first and second partition plates dividing the vessel into first, second and third chambers; and a filtration module located within the second chamber and defining a fluid inlet in communication with the third chamber and a fluid outlet in communication with the first chamber.

In use, a feed fluid or fluid to be treated, such as seawater, may be flowed or driven from the third chamber into and through the filtration module to be filtered therein, with filtered fluid, or permeate, exiting the filtration module into the first chamber. Permeate may then be drawn from the first chamber to exit the vessel and be passed for appropriate use and/or further treatment.

The first and second partition plates may be arranged such that the second chamber is interposed between the first and third chambers.

The filtration module may extend between the first and second partition plates. The filtration module may be engaged with the first and second partition plates. The filtration module may be supported at opposing ends by the first and second partition plates, thus providing robust support for the filtration module, and also creating a rigid construction of the filtration apparatus.

One or both of the first and second partition plates may define a through hole, wherein the filtration module is sealed relative to said through holes. In one embodiment the first partition plate may define a through hole, and the outlet of the filtration module may be sealed relative to said through hole. The second partition plate may define a through hole, and the inlet of the filtration module may be sealed relative to said through hole.

The filtration module may define a body section having a width greater than the width of a through hole in one or both of the first and second partition plates.

The apparatus may comprise a reducing connector having a first end secured to the body section of the filtration module and a second end sealed relative to a through hole in the first partition plate to permit communication between the filtration module and the first chamber.

The apparatus may comprise a further reducing connector having a first end secured to the body section of the filtration module and a second end sealed relative to a through hole in the second partition plate to permit communication between the filtration module and the third chamber.

One or both of the first and second partition plates may be sealed relative to the internal surface of the vessel. One or both of the first and second partition plates may be welded to the internal wall surface of the vessel. In some embodiments the vessel may be provided in separate parts and one or both of the first and second partition plates may be clamped between separate parts of the vessel.

In some embodiments the filtration module may permit fluid communication from the third chamber into the second chamber. In such an arrangement the second chamber may be filled with a feed fluid by flow of the fluid from the third chamber via the filtration module.

In some embodiments the filtration module may permit fluid communication from the first chamber into the second chamber.

The apparatus may be configured to accommodate reverse flow of fluid from the first chamber and into the filtration module, for example to perform a backwashing cleaning operation.

Reverse flow, which will likely become polluted by material washed from the filtration module, may exit the filtration module into the second chamber. Furthermore, the reverse flow exiting into the second chamber from the filtration module may be isolated from the third chamber, thus preventing fluid within the third chamber becoming contaminated. In this way, during reverse flow, the third chamber may remain filled with fluid to be treated. In some embodiments, the presence of fluid within the third chamber may prevent any reverse flow entering said chamber, thus achieving appropriate isolation. Isolation of the second and third chambers during reverse flow may eliminate the requirement to drain the volume of the third chamber before reconfiguring the apparatus to operate in a conventional forward filtration mode, thus reducing the time the apparatus is held off-line to perform cleaning.

Reverse flow may exit the filtration module into the third chamber. In such an arrangement the second chamber may remain isolated from the third chamber and thus the contaminated backwashed fluid. As such, the second chamber may not need to be drained.

The arrangement of the apparatus, and in particular the provision of the separate second and third chambers may permit forward washing of the filtration module. For example, a washing fluid may be driven from the third chamber and into the module and flowed across the surface of a membrane contained therein, with the forward washed fluid exiting the module and into the second chamber.

Furthermore, isolation of the second and third chambers during reverse flow may permit the simultaneous forward flow of fluid from the third chamber through or across the filtration module. Such combination of forward and reverse flow may enable more thorough cleaning of the filtration module.

The apparatus may be configured to accommodate flow of a gas from the third chamber and into the filtration module, for example to perform a cleaning operation within the filtration module.

The apparatus may be configured to accommodate flow of a gas from the first chamber and into the filtration module.

Accordingly, cleaning of the filtration module may be achieved in multiple ways, for example by backwashing, by forward flow, by bubbling gas through the filtration module, or any suitable combination thereof. As such, the provision of first and second partition plates to define three separate chambers within the vessel may permit a greater range of cleaning operation to be performed in comparison to prior art systems.

The filtration module may comprise an outer shroud.

The shroud may comprise one or more ports to permit fluid communication between external and internal regions of the shroud. The ports may be arranged to permit communication with the second chamber. For example, the ports may permit fluid within the second chamber to enter the filtration module to be filtered therein. The ports may be configured to permit fluid within the filtration module to exit the filtration module into the second chamber. For example, the second chamber may be filled with a feed fluid, for example during commissioning of the apparatus, by flow initially into the filtration module from the third chamber and then into the second chamber via the one or more ports in the shroud of the filtration module. In some embodiments the ports may permit fluid which has been reverse flowed through the filtration module from the first fluid chamber, for example in a backwashing operation, to enter the second chamber.

One or more ports may be located adjacent or in proximity to the first partition plate.

The one or more ports in the shroud may be positioned to permit fluid to be retained within the filtration module, irrespective of the level of any fluid contained within the second chamber. Such an arrangement may permit the filtration module to accommodate a cleaning process using bubbling of a gas through the filtration module.

The filtration module may be elongate.

The filtration module may be arranged generally vertically within the vessel.

The apparatus may comprise a plurality of filtration modules located within the second chamber. Two or more of the filtration modules may be configured similarly, for example as defined above. All filtration modules may be configured similarly, for example as defined above.

The apparatus may comprise a tubular member extending from the second partition plate and into the third chamber, and arranged in communication with the filtration module. Accordingly, flow between the third chamber and the filtration module may be achieved via the tubular member.

The tubular member may facilitate delivery of a gas from the third chamber into the filtration module.

In some embodiments the apparatus may comprise:

a plurality of filtration modules each sealingly engaged relative to a respective through hole in the second partition plate; and a plurality of tubular members extending into the third chamber and in communication with a respective filtration module.

The tubular members may facilitate distribution, for example even distribution, of a fluid from the third chamber into the filtration modules. For example, the tubular members may facilitate distribution of a fluid to be treated, a cleaning gas or the like.

The vessel may define or comprise one or more ports to permit fluid communication to and/or from the vessel.

A further aspect of the present invention relates to a filtration apparatus for treating a fluid, comprising:

a vessel;

first and second partition plates dividing the vessel into first, second and third chambers;

a filtration module located within the second chamber and defining a fluid inlet in communication with third chamber and a fluid outlet in communication with the first fluid chamber; and a tubular member extending from the second partition plate and into the third chamber, and arranged to establish communication between the third chamber and the filtration module.

Accordingly, flow between the third chamber and the filtration module may be achieved via the tubular member.

The tubular member may extend from a through hole in the second partition plate into the third chamber. The tubular member may define an open end to facilitate communication of a fluid, such as a feed fluid, from the third chamber into the tubular member.

The tubular member may facilitate delivery of a gas from the third chamber into the filtration module, for example for use in a cleaning process. In some embodiments a gas may be introduced into the third chamber during a cleaning operation. For example, during a filtering operation the third chamber may be substantially completely filled with a feed fluid, with gas being introduced into the chamber when cleaning is to be performed. The tubular member may facilitate delivery of a gas from the third chamber into the filtration module when the tubular member and the filtration module are at least partially filled with a fluid, specifically a liquid.

The tubular member may define a port in an outer surface thereof to facilitate communication of gas from the third chamber. The port may be positioned on the tubular member to be positioned within an upper region of the third chamber. Such an arrangement may permit the port to be in communication with a gas space which might be present in an upper region of the third chamber, for example supplied into the third chamber to form a gas space during a cleaning operation.

The port may be positioned at an elevated position above an open end of the tubular member. In use, for example during a cleaning operation, the open end of the tubular member may be located below a liquid level defined in the third chamber which defines a lower boundary of a gas space, and the port may be located above said liquid level, such that communication with a gas in said gas space may be permitted through the port. Gas located above said liquid level may be communicated into the tubular member by virtue of a pressure differential between the gas within the gas space and fluid within the tubular member at the location of the port. For example, a fluid, specifically a liquid, contained within the tubular member will be subject to a hydrostatic pressure which will vary in accordance with its height. Further, the pressure of the gas will be substantially defined by the pressure of the liquid at the liquid level in the third chamber. In this respect, the hydrostatic pressure of the fluid within the tubular member at the location of the port will be lower than that at the liquid level within the third chamber, and thus lower than the pressure of the gas within the third chamber, with the pressure differential being proportional to the height difference between the liquid level and the port. Accordingly, the presence of this differential may facilitate inflow of gas into the tubular member.

The port may be appropriately dimensioned to provide a desired flow rate of gas.

In use, a gas may be communicated into the third chamber by flowing through any liquid contained therein to form a gas space in the top of the chamber. Alternatively, or additionally, a gas may be directly communicated, for example by appropriate pipe work, into a gas space in the chamber, and/or directly into the tubular member via the port.

Further aspects of the present invention may relate to methods for cleaning a filtration apparatus such as defined herein.

For example, a method for cleaning a filtration apparatus which includes a vessel with first, second and third chambers and a filtration module located within the second chamber, comprises:

flowing a cleaning fluid into the third chamber;

flowing the cleaning fluid from the third chamber and into the filtration module;

flowing the cleaning fluid across the surface of a filtration membrane contained within the filtration module;

flowing the fluid from the filtration module and into the second chamber.

An aspect of the present invention may relate to a method for cleaning a filtration module which is located in a vessel including steps of both forward and back washing of the filtration module. Such cleaning may be achieved using a fluid, such as previously treated fluid, a chemical solution, a gas and/or the like.

Forward washing may be achieved by flowing a washing fluid across a surface of a membrane within the filtration module. Back washing may be achieved by flowing a washing fluid through a membrane within the module.

An aspect may relate to a method for cleaning a filtration apparatus which includes a vessel with first, second and third chambers and a filtration module located within the second chamber, comprising:

flowing a backwash cleaning fluid from the first chamber and into the filtration module;

flowing the backwash cleaning fluid through the module; and flowing the backwash fluid into only one of the second and third chambers.

Accordingly, by flowing the backwash fluid into only one of the second and third chambers, the other chamber which does not receive the backwash fluid may not need to be drained before configuring the filtration apparatus for a filtering mode of operation.

Further aspects of the present invention may relate to methods for manufacturing a filtration apparatus such as defined herein.

For example, aspects may relate to a method of manufacturing a filtration apparatus by securing a filtration module relative to a partition plate which is mounted in a vessel, wherein the partition plate defines a through hole which is smaller than the width of a body portion of the filtration module, said through hole provided for permitting fluid communication of a fluid, such as a treated fluid from the filtration module and into a chamber defined by the partition plate in the vessel.

The method of manufacturing may comprise securing the filtration module relative to a second partition plate, wherein the second partition plate defines a through hole which is smaller than the width of a body portion of the filtration module; and mounting the second partition plate within the vessel.

An aspect of the present invention relates to a filtration apparatus for treating a fluid, comprising:
a vessel;
a first partition plate dividing the vessel into first and second chambers and defining a through hole; and
a filtration module located within the second chamber and having a permeate outlet sealed relative to the through hole in the partition plate to permit communication between the filtration module and the first chamber, wherein the filtration module defines a body section having a width greater than the width of the through hole in the partition plate.

A further aspect of the present invention relates to a filtration module comprising a body section and a reducing connector mounted to one end of the body section, wherein the reducing connector permits the module to be sealed relative to an aperture which has a smaller width than the body section of the filtration module.

A further aspect of the present invention relates to a filtration module comprising:
filtration media;
a shroud encasing the filtration media and defining a flow path between said shroud and a surface of the filtration media, wherein the shroud defines at least one port in a side wall thereof at a location which permits a desired level of fluid to be retained within the flow path.

In use, the filtration module may be arranged generally vertically and the at least one port may be located in an upper region of the shroud.

Various features defined in relation to one aspect may be utilised in combination with any other aspect of the present invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
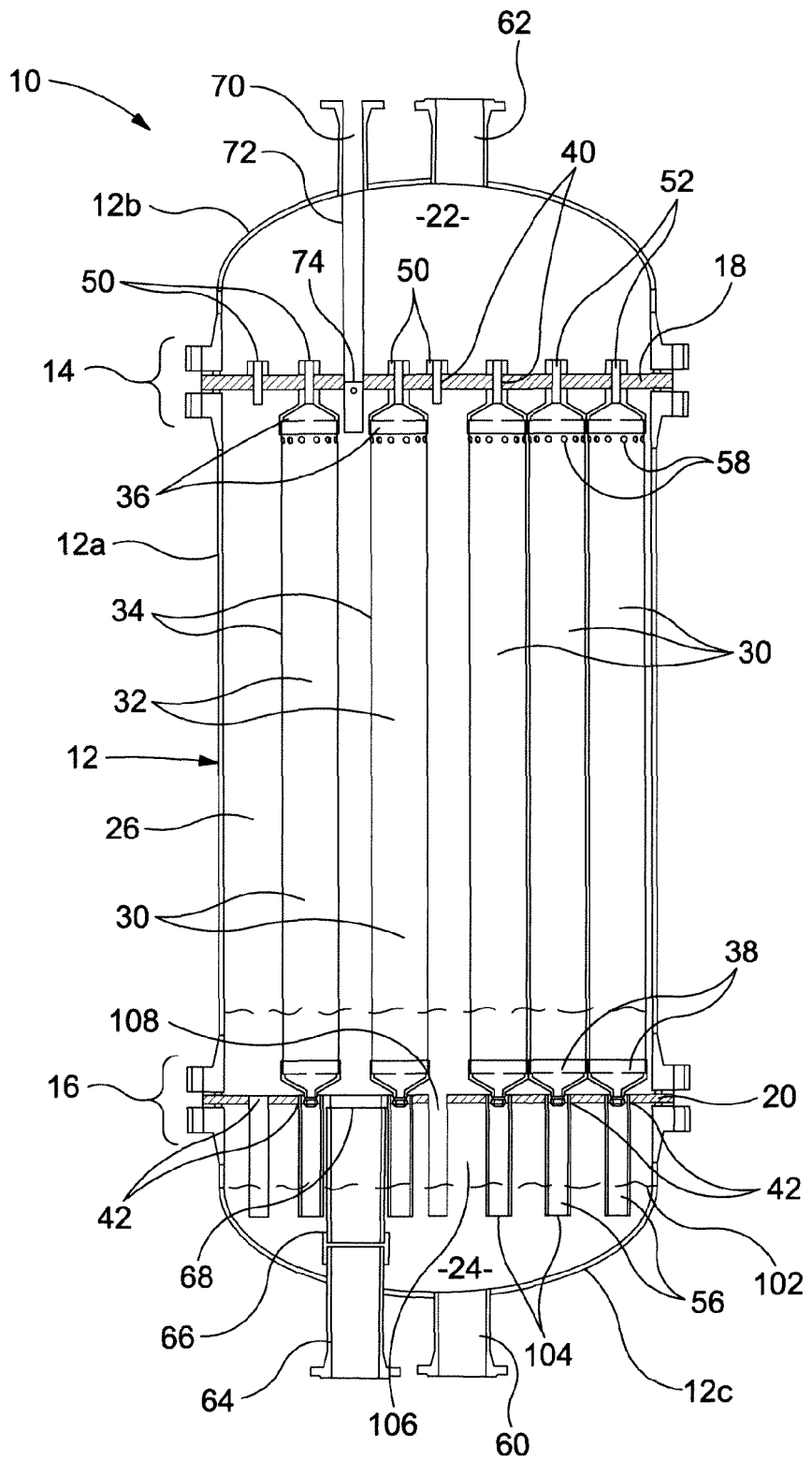
FIG. 1 is a cross sectional view of a filtration apparatus.

A filtration apparatus, generally identified by reference numeral 10, is shown in FIG. 1 and includes a vessel 12, illustrated in cross-section, and formed of a central cylindrical section 12a and upper and lower domed cap sections 12b, 12c mounted to opposing ends of the central section 12a via respective flange joints 14, 16. Upper and lower partition plates 18, 20 are mounted within the vessel 12 to define upper, lower and intermediate chambers 22, 24, 26. The periphery of the upper partition plate 18 is clamped and sealed between the central and upper cap sections 12a, 12b of the vessel 12 at the region of flange joint 14. Similarly, the periphery of the lower partition plate 20 is clamped and sealed between the central and lower cap sections 12a, 12c of the vessel 12 at the region of flange joint 16.

The apparatus 10 comprises a plurality of filtration modules 30 located within the intermediate chamber 26 and mounted between the upper and lower partition plates 18, 20. The modules 30 each include one or more filtration membranes (not illustrated) mounted therein. The type of filtration achieved is determined by the membrane type, and may include size exclusion, for example by use of micro and ultra filtration membranes, and/or ionic selection or rejection, for example by use of nano filtration and reverse osmosis membranes. In some embodiments perhaps between 2 and 65 filtration modules may be provided, for example between 30 and 40 modules, such as 38 modules, although any suitable number may be provided depending on the specific application, available space and the like. Further, in some embodiments a membrane area of between 10 and 100 $m^2$ may be provided in each module. In one embodiment each module may comprise between 40 and 50 $m^2$ of membrane filtering surface area, for example around 44 $m^2$ of filtering surface area. It should be noted that some filtration modules are not illustrated in FIG. 1 for clarity purposes.

Figure 2:
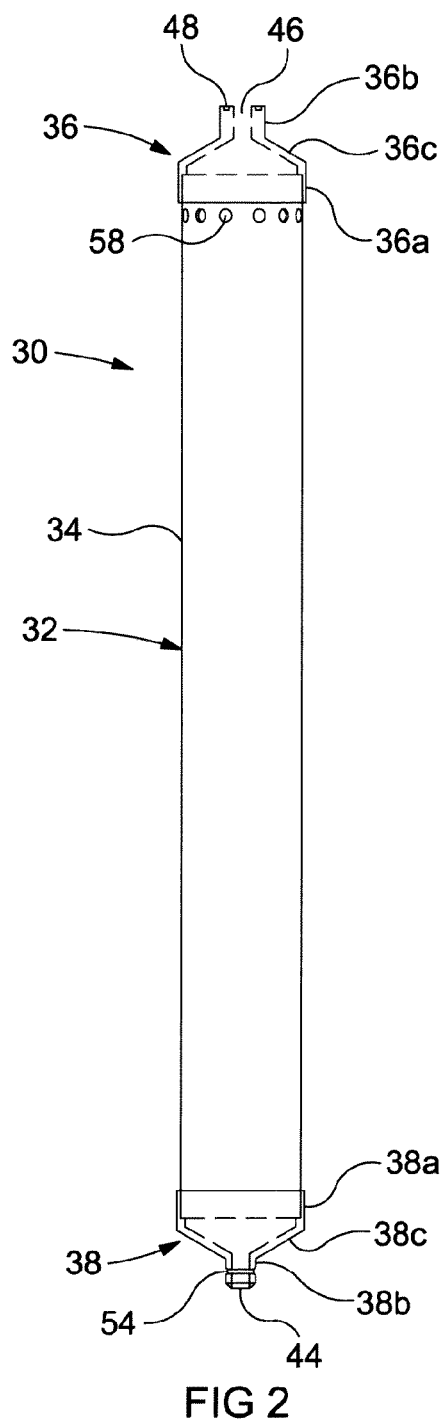
FIG. 2 illustrates a filtration module for use within a filtration apparatus of FIG. 1.
Figure 3A:
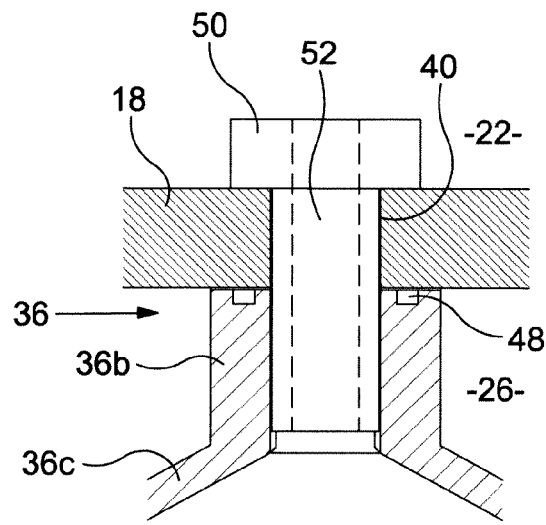
FIGS. 3a and 3b provide enlarged cross-sectional views of upper and lower ends, respectively, of the filtration module of FIG. 3 shown connected within the apparatus.
Figure 3B:
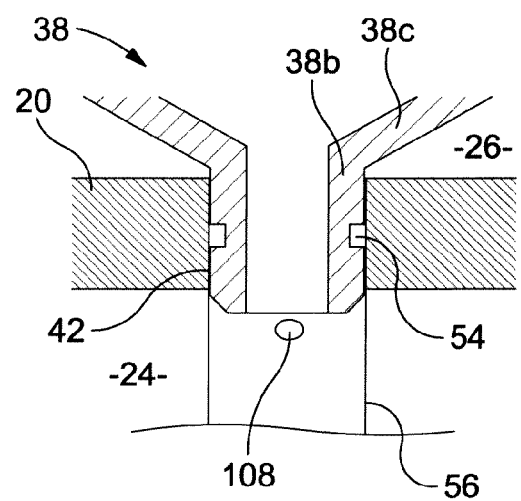

Reference is now additionally made to FIGS. 2, 3a and 3b, wherein FIG. 2 provides an enlarged view of an individual filtration module 30, FIG. 3a provides a still larger cross sectional view of the upper region of the filtration module 30 shown engaged with the upper partition plate 18, and FIG. 3b provides an enlarged cross-sectional view of the lower region of the filtration module 30 shown engaged with the lower partition plate 20.

Each filtration module 30 comprises an elongate body section 32 which includes an outer tubular shroud 34 enclosing the filtration membranes, and upper and lower reducing connectors 36, 38 secured to respective ends of the shroud 34. The connectors 36, 38 may be secured to the shroud 34 by, for example, threaded connection, adhesive bonding or the like.

The reducing connectors 36, 38 permit engagement of the filtration module 30 with the upper and lower partition plates 18, 20. In particular, the upper connector 36 of each filtration module 30 is sealingly engaged relative to a respective through hole 40 in the upper partition plate 18, thus permitting fluid communication between each filtration module 30 and the upper chamber 22. Further, the lower connector 38 of each filtration module 30 is sealed relative to a respective through hole 42 in the lower partition plate 20, thus permitting fluid communication between the lower chamber 24 and each filtration module.

In use, fluid to be filtered (such as seawater) may be driven from the lower chamber 24 and into the filtration modules 30 via the respective lower connectors 38, through the filtration membranes in the modules 30, with filtered water exiting the filtration modules via the respective upper connectors 36 and into the upper chamber 22. Accordingly, a lower connector 38 may define an inlet 44 of each filtration module 30, and an upper connector 36 may define an outlet 46.

Each reducing connector 36, 38 includes a first cylindrical portion 36a, 38a, a second, smaller diameter cylindrical portion 36b, 38b, and a tapered portion 36c, 38c extending therebetween, thus providing a funnel type structure.

The first cylindrical portions 36a, 38a are secured and sealed to respective ends of the shroud 34.

The second cylindrical portion 36b of each upper connector 36 engages a lower face of the upper partition plate 18. In particular, the second cylindrical portion 36b of each upper connector 36 superposes a through hole 40 in the upper plate 18 and engages the plate 18 around the periphery of the through hole 40. An end face of the second cylindrical portion 36b of the upper connector 36 defines an annular groove 48 which accommodates a seal member, such as an o-ring, to provide sealing between the upper plate 18 and the connector 36.

Each filtration module 30 is connected to the upper plate 18 by respective quill bolts 50 which extend through the through holes 40 from the upper chamber side 22 and threadedly engage the second cylindrical portion 36b, such that tightening of the quill bolts 50 presses the second cylindrical portion 36b of each connector 36 against the upper plate 18. Each quill bolt 50 defines a central bore 52 to retain fluid communication between the modules 30 and the upper chamber 22.

The second cylindrical portion 38b of each lower connector 38 is received within a through hole 42 in the lower partition plate 20. An outer surface of each second cylindrical portion 38b defines an annular groove 54 which accommodates a seal member, such as an o-ring, to provide sealing between the hole 42 in the lower plate 20 and the connector 38. The second cylindrical portion 38b of the lower connector is simply pushed into a respective through hole 42 in the lower partition plate 20, thus providing a simple structure with relative ease of manufacture. Furthermore, this arrangement permits relative movement between the filtration modules 30 and the lower plate 20 to be achieved, which may accommodate any deflections or the like within the apparatus 10 caused by effects of, for example, pressure, temperature and the like.

It should be noted that the reducing connectors 36, 38 permit the size of the through holes in the partition plates 18, 20 to be minimised without requiring a reduction in the outer dimensions, and thus capacity, of the body portion 32 of the modules. In this way the strength of the partition plates may be preserved, permitting thinner plates to be utilised, thus providing cost and weight savings.

A tubular member 56 extends through and from each through hole 42 in the lower plate 20 and into the lower chamber 24. Each tubular member 56 facilitates communication of a fluid from the lower chamber 24 into respective filtration modules 30. As will be described in further detail below, each tubular member 56 also facilitates distribution of a gas, such as a cleaning gas, into the filtration modules 30.

The shroud 34 of each filtration module 30 includes an array of ports 58 located at the upper end thereof adjacent the upper connectors 36 to provide fluid communication between the filtration modules and the intermediate chamber 26. In particular, the ports 58 permit fluid communication between a retentate side of filtration membranes within the modules 30 and the intermediate chamber 26.

The vessel 12 includes a number of ports to facilitate fluid communication to and/or from the vessel 12. As will be described in further detail below, individual ports may have multiple purposes depending on the operational mode of the apparatus 10, such as a filtering mode, cleaning mode or the like. For example, in some operational modes certain ports may define fluid inlets providing fluid communication into the vessel 12, whereas in other operational modes the same ports may define fluid outlets providing fluid communication from the vessel 12.

In the present embodiment the vessel 12 defines a port 60 for permitting fluid communication to and/or from the lower chamber 24. As will be described in further detail below, the port 60 may permit a fluid to be treated, such as seawater, to be communicated into the lower chamber 24. Further, the port 60 may permit a cleaning fluid, such as a chemical, a gas or the like, to be communicated into the lower chamber 24.

The vessel 12 further defines a port 62 for permitting fluid communication to and/or from the upper chamber 22. As will also be described in detail below, the port 62 may permit a filtered fluid to be drawn from the upper chamber 22 of the vessel 12, and to permit a cleaning fluid such as previously filtered fluid, a chemical, a gas or the like, to be communicated into the upper chamber 22.

The vessel 12 further defines a port 64 for permitting fluid communication to and/or from the intermediate chamber 26. In one embodiment the port 64 may be for use in permitting fluid to drain from the intermediate chamber 26. In the embodiment illustrated in FIG. 1, the port 64 is established by a tubular structure 66 which extends from an aperture 68 in the lower partition plate 20, through the lower chamber 24 and through the wall of the lower cap portion 12c of the vessel 12. Such an arrangement may permit complete draining of the intermediate chamber 26 when the apparatus is vertically orientated, as illustrated. However, in other embodiments the port 64 may be established to extend through a wall of the central cylindrical section 12a of the vessel 12.

The vessel 12 also defines a further port 70 for permitting fluid communication to and/or from the intermediate chamber 26. In one embodiment the port 70 may permit control of pressure within the intermediate chamber 26, and may define a vent, for example. The port 70 is established by a tubular structure 72 which extends from an aperture 74 in the upper partition plate 18, through the upper chamber 22 and through the wall of the upper cap portion 12b of the vessel 12. However, in other embodiments the port 70 may be established to extend through a wall of the central cylindrical section 12a of the vessel 12.

Figure 4:
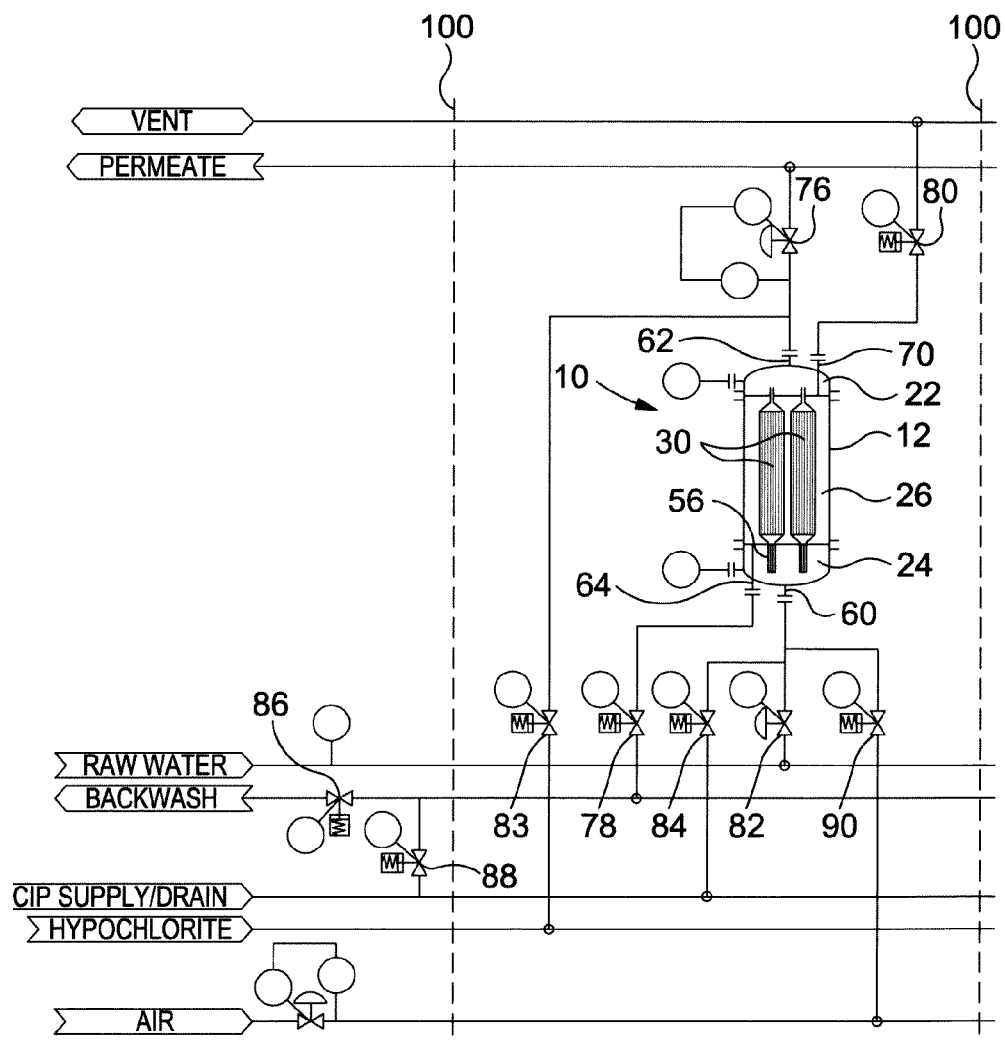
FIG. 4 provides a piping and instrumentation diagram of a filtration system which may include the filtration apparatus of FIG. 1.

The various ports 60, 62, 64, 70 may permit the vessel 12 to be appropriately connected to pipe-work to define a complete filtration system, as illustrated in FIG. 4, reference to which is additionally made. In this respect, the capacity of the system may be increased by creating a parallel arrangement of the various apparatus located between broken lines 100.

Various operational modes of the filtration apparatus 10 will now be described. It should be recognised that the various features and structure of the apparatus 10 can permit many variations of operation to be undertaken, and as such the examples below are not exhaustive, but are simply provided for illustration only. Furthermore, the apparatus 10 may be utilised to treat many different fluids. However, in the examples below the apparatus 10 is utilised to treat water, such as seawater. Such treatment may permit a product water to be provided from the apparatus, or may function as one treatment stage in a larger treatment process.

For example, the apparatus 10 may function to pre-treat seawater prior to a further treatment, such as a desalination treatment.

Commissioning

To commission and fill the vessel 12 in preparation for filtration, ports 62 and 64 are closed via respective valves 76 and 78, port 70 is opened via valve 80 to vent the intermediate chamber 26 to atmosphere, and valve 82 is opened to communicate raw water to the vessel 12 via port 60. Although not illustrated, the raw water may be pumped through port 60.

Accordingly, raw water may enter the lower chamber 24 and subsequently flow into the filtration modules 30 via the individual tubular members 56. The raw water may then pass upwardly within the shroud 34 of each module 30 and exit into the intermediate chamber 26 via the array of ports 58 at the top end of each shroud 34, thus permitting the intermediate chamber 26 to become filled, with air in said chamber 26 being displaced via the port 70. Complete filling of the intermediate chamber 26 may be recognised when water begins to flow through vent port 70, at which stage valve 80 may be actuated to close said port 70, such that the pressure within the vessel 12 may be increased to the desired operational pressure which will permit water to pass through the membranes in the modules 30.

Filtration

When filtration of the raw water is to be performed valve 82 remains open and valve 76 is actuated to open, such that water may be driven through the membranes in the modules 30, with filtered water exiting the modules 30 into the upper chamber 22. The filtered water may then exit the vessel 12 via port 62.

Cleaning

During use the membranes within the modules 30 will become fouled and blocked with particulate and other matter, such that the pressure drop across the modules will increase over time, reducing the efficiency of the apparatus 10. This may be addressed by various cleaning operations. In this respect it should be noted that the disclosed exemplary embodiment of the present invention permits multiple types of cleaning procedures to be utilised, providing significant advantages over prior art systems. Some examples of cleaning operation are provided below, and it should be understood that these are only exemplary and that various other operations or combination of operations may also be possible.

Cleaning Example 1

Backwashinq

Valve 82 is closed to prevent further flow of raw water through port 60, and to maintain the lower chamber 24 filled with water. Valve 80 is opened to permit the vessel to be depressurised by venting via port 70, and valve 78 is also opened to permit fluid within the intermediate chamber 26 to drain therefrom. Valve 76 remains open and filtered fluid is reverse flowed, for example by being pumped, into the upper chamber 22 via port 62 and into and through the filtration modules 30, thus backwashing the membranes contained therein. The backwashed fluid which will carry the matter dislodged from the membranes then exits the modules 30 via ports 58 and into the intermediate chamber 26 and subsequently drained via port 64.

The presence of the fluid within the lower chamber 24 prevents the backwashed fluid from entering said chamber. Accordingly, the present embodiment permits the lower and intermediate chambers 24, 26 to be isolated from each other during backwashing thus eliminating the requirement to drain and re-fill the third chamber and therefore minimising the time that the apparatus 10 must be held off-line to perform this type of cleaning.

Cleaning Example 2

Backwashinq

As a variation to Example 1 above, valve 78 may be closed to retain fluid within the intermediate chamber 26, and valve 84 may be opened. Accordingly, backwashed fluid from the upper chamber 22 may be washed through the modules 30 and exit into the lower chamber 24 to be drained via port 60. The presence of the fluid within the intermediate chamber 26 prevents the backwashed fluid from entering said chamber, and as such the intermediate chamber 26 may not need to be drained and re-filled, minimising down-time of the apparatus 10 for cleaning.

Cleaning Example 3

Forwardwashinq

In certain circumstances cleaning of the membranes may be achieved by forward flow of a washing fluid through the modules. In one configuration the forward washing fluid may pass through the membranes in a conventional filtering direction.

In another configuration the forward washing fluid may be cross-flowed over the surface of the membranes thus dislodging particulate and other material. That is, fluid may be passed over the surface of the membranes without, or with a minimal volume, passing through the membranes. The exemplary embodiment disclosed permits such cross-flow forwardwashing by virtue of the lower and intermediate chambers 24, 26 being isolated from each other.

To achieve forwardwashing valve 82 may be opened to permit raw water to flow into the third chamber via port 60, into the modules 30 and across the surfaces of the membranes, with the forwardwashed water containing dislodged material exiting into the intermediate chamber 26 via shroud ports 58. Valve 78 may be held open to permit the forward flowing water to be continuously drained from the intermediate chamber 26. As fluid is continuously drained from the intermediate chamber 26 pressure may not be permitted to be raised above that required to drive the fluid through the membranes.

All other valves and ports may be configured as necessary. For example valve 80 may be opened to also assist to avoid pressure developing in the intermediate chamber 26.

As a variation in this example the forward washing water may be provided by previously filtered water or permeate which is appropriately delivered or diverted into the lower chamber 24, for example via the port 60 and appropriate valves and piping.

Cleaning Example 4

Simultaneous Backwashing and Forwardwashing

The filtration apparatus in the disclosed exemplary embodiment may also support both forwardwashing and backwashing to be achieved simultaneously. Such may be achieved by opening valve 76 to permit permeate to be backwashed through the modules, opening valve 82 to permit raw water to be forwardwashed through the modules and across the membrane surfaces, and opening valve 78 to permit dirty forwardwashed and backwashed water to be drained from the intermediate chamber 26. All other valves may be configured appropriately.

As a variation, forwardwashing fluid may be provided by permeate which is diverted through port 60 via an appropriate valve arrangement.

Cleaning Example 5

Chemically Enhanced Washing

In certain circumstances it may be desired to expose the membranes to a chemical to facilitate cleaning, for example to dissolve particulate matter, destroy bacterial growth and the like.

In one example a Chemically Enhanced Backwashing (CEB) may be utilised. Such CEB may be achieved in one example by opening valve 83 to permit a chemical, such as hypochlorite, to be dosed into backwashing permeate water and delivered into the vessel via port 62, with all other ports and valves configured appropriately for backwashing, as defined in Example 1 (or Example 2) above.

Furthermore, as the embodiment disclosed herein also permits forwardwashing to be achieved, as defined in Example 3 above, it is also possible in a variation to enhance such forward washing by dosing a chemical, such as hypochlorite into the raw water, or permeate, which is delivered into the vessel via port 60, with an appropriate piping and valve arrangement. Of course, simultaneous forward and backwashing may be achieved, as in Example 4 above, with chemical enhancement.

In certain embodiments it may be desired to allow the modules 30 to soak in the chemical which is introduced into the vessel 12.

A conventional backwash or forward wash may be performed before and/or after a chemically enhanced cleaning process.

Cleaning Example 6

Cleaning-in-Place

The exemplary embodiment of the present invention may support a cleaning process known as Cleaning In Place (CIP), which may be utilised in circumstances where backwashing may not be sufficient, or where a more thorough cleaning is required, for example. In such an arrangement a CIP fluid, which may include a warmed fluid, a chemical or the like, may be delivered into the vessel via valve 84 and port 60, with the fluid appropriately flowing through the modules 30 and into the intermediate chamber 26. The CIP fluid may be retained within the vessel for a required period of time to allow the various components, and in particular the modules 30, to soak in the fluid.

The CIP fluid may be drained from the lower chamber 24 and from within the modules 30 via port 60 and valve 84. Further, the CIP fluid may be drained from the intermediate chamber 26 via port 64, and valve 78, and be routed to an appropriate drain by use of valves 86 and 88.

Cleaning Example 7

Gas Scouring

The filtration apparatus 10 in the disclosed exemplary embodiment may support cleaning of the membranes by use of gas bubbles which function to scour the surfaces of the membranes.

In one example filtration may be ceased by closing valve 82, which will have the effect of retaining fluid within the lower chamber 24. The vessel 12 may be depressurised via valve 80 and port 70 and valve 78 may be opened to permit the intermediate chamber 26 to drain through port 64. Although the intermediate chamber 26 may be drained it should be noted that the modules 30 and tubular members 56 will remain filled with water by virtue of the shroud ports 58 being located at the upper ends of the modules 30.

A gas, such as air, may be delivered into the lower chamber 24 via valve 90 and port 60, passing upwardly through the liquid to form a gas space 106. In this respect, the fluid retained within the lower chamber 24 defines a liquid level 102, as illustrated in FIG. 1, which is located above lower open ends 104 of each tubular member 56, such that each tubular member 56 dips into the liquid in the lower chamber 24.

Each tubular member 56 also defines a port 108 (FIGS. 1 and 3b) in an outer surface thereof to facilitate communication of gas from the gas space 106 into the associated tubular member 56. Each port 108 is positioned at an elevated position above the liquid level 102 to permit inward flow of the gas by virtue of a pressure differential between the lower chamber 24 and the region of each tubular member 56 at the location of the port 108. This pressure differential is established by the difference in hydrostatic pressure between the liquid level in the tubular member 56 at the level of the port 108, and the liquid level 102 in the third chamber, wherein the pressure in the gas space 106 will be substantially equal to the pressure at said liquid level 102. Accordingly, the presence of this differential will facilitate relatively even distribution and inflow of gas into the tubular members 56.

The ports 108 and height differential between the ports 108 and liquid level 102 may be appropriately dimensioned to provide a desired flow rate of gas.

The gas which enters the tubular members 56 may then bubble upwardly through the fluid contained in the modules 30, with the bubbling action scouring and agitating the surface of the membranes to assist in dislodging particulate and other matter.

Such gas scouring cleaning may be achieved during backwashing and/or forwardwashing, and/or in combination with a chemically based cleaning operation, such as a chemically enhanced washing or a CIP operation.

Further, gas scouring may also be achieved by delivering gas into the vessel 12 initially via the upper chamber 22.

It should be understood that the embodiments described herein are merely exemplary and that various modifications may be made thereto without departing from the scope of the invention. For example, the shroud component 34 of the modules may be optional in some embodiments. Furthermore, the reducing connectors may not be funnel shaped and may define a substantially constant diameter with appropriate sealing being provided to permit engagement with smaller diameter through holes in the partition plates. Also, it should be noted that although the illustrated embodiment orientates the apparatus vertically, other orientations are possible, such as horizontally or the like. Any number and size of filtration module may be provided. Also, in certain embodiments the apparatus may only include an upper partition plate and thus the vessel may only include two chambers. Further, in the illustrated embodiment a mechanical connection is achieved between the modules and the upper plate, whereas a compliant connection is provided between the modules and the lower plate. However, in an alternative embodiment the modules may be mechanically and substantially rigidly secured to the lower plate and compliantly secured or associated with the upper plate.

The invention claimed is:

1. A filtration apparatus for treating a fluid, comprising:
a vessel;
a first partition plate defining a through hole;
a second partition plate, wherein the first and second partition plates divide the vessel into first, second and third chambers, the first and second partition plates being arranged such that the second chamber is interposed between the first and third chambers, with the first partition plate located above the second partition plate;
a filtration module treating the fluid arranged generally vertically within the vessel and located within the second chamber and including a body section defining an outer width which is greater than the width of the through hole in the first partition plate; and
a reducing connector permitting fluid flow between the first chamber and the filtration module and defining an upper end of the filtration module and having a first end secured to the body section of the filtration module at an upper end of the body section of the filtration module, and a second end secured to the first partition plate by a bolt which extends from one side of the first partition plate to engage an inner surface of the second end of the reducing connector on an opposite side of the first partition plate, the second end of the reducing connector comprising a peripheral seal located thereon, and having a smaller outer diameter than an outer diameter of the first end of the reducing connector and an outer diameter larger than the through hole in the first partition plate and positioned so as to superpose the through hole in the first partition plate and is sealed, via the bolt and the peripheral seal, relative to a lower surface of the first partition plate and around a periphery of the through hole to permit communication between the filtration module and the first chamber, wherein the reducing connector is secured to the body section of the filtration module by a fixed connection, the fixed connection preventing movement between the reducing connector and the body section of the filtration module.

2. The apparatus according to claim 1, wherein the reducing connector defines a permeate outlet of the filtration module.

3. The apparatus according to claim 1, wherein the reducing connector comprises:
a tapered portion extending between the first and second ends.

4. The apparatus according to claim 1, wherein the second end of the reducing connector that superposes the through hole is sealed relative to the lower surface of the first partition plate around the periphery of the through hole.

5. The apparatus according to claim 1, wherein at least a portion of the reducing connector extends into the through hole in the first partition plate and is sealed relative to an internal surface of the through hole.

6. The apparatus according to claim 1, wherein the reducing connector is secured to the first partition plate by at least one of threaded arrangement, adhesive bonding, welding, interference fitting and integrally forming.

7. The apparatus according to claim 1, wherein the bolt clamps the reducing connector against the first partition plate.

8. The apparatus according to claim 7, wherein the bolt defines an axial through bore such that when the bolt is connected with the reducing connector fluid communication through the through bore of the bolt is permitted, and fluid communication between the filtration module and the first chamber within the vessel is achieved via the through bore in the bolt.

9. The apparatus according to claim 1, wherein the filtration module comprises one or more filtration membranes including at least one of a micro-filtration membrane, an ultra-filtration membrane, a nano-filtration membrane and a reverse osmosis membrane.

10. The apparatus according to claim 1, wherein the filtration module defines a fluid inlet for receiving the fluid to be filtered.

11. The apparatus according to claim 10, wherein the fluid inlet is defined at one end of the filtration module opposite the reducing connector.

12. The apparatus according to claim 1, wherein the filtration module comprises an outer shroud, and the reducing connector is secured to the shroud.

13. The apparatus according to claim 12, wherein the shroud comprises one or more ports to permit fluid communication between external and internal regions of the shroud.

14. The apparatus according to claim 13, wherein the one or more ports are arranged to permit communication with the second chamber.

15. The apparatus according to claim 13, wherein the one or more ports are located adjacent the reducing connector.

16. The apparatus according to claim 13, wherein the one or more ports are positioned to permit the fluid to be retained within the filtration module, irrespective of the level of any fluid contained within the second chamber.

17. The apparatus according to claim 1, wherein the first partition plate is sealed relative to an internal surface of the vessel.

18. The apparatus according to claim 1, comprising a plurality of filtration modules located within the second chamber and each sealed relative to a respective through hole in the first partition plate.

19. The apparatus according to claim 1, wherein the second partition plate is sealed relative to the internal surface of the vessel.

20. The apparatus according to claim 1, wherein the filtration module extends between the first and second partition plates.

21. The apparatus according to claim 1, wherein the second partition plate defines a through hole and an inlet of the filtration module is sealed relative to said through hole to permit communication between the filtration module and the third chamber.

22. The apparatus according to claim 21, wherein the through hole in the second partition plate defines a smaller width than the outer width of the filtration module.

23. The apparatus according to claim 21, comprising a further reducing connector having a first end secured to the body section of the filtration module and a second end sealed relative to the through hole in the second partition plate.

24. The apparatus according to claim 23, wherein at least a portion of the further reducing connector is inserted into the through hole in the second partition plate.

25. The apparatus according to claim 21, comprising a tubular member extending from the through hole in the second partition plate into the third chamber and providing communication between the third chamber and the filtration module.

26. The apparatus according to claim 25, wherein the tubular member defines an open end to facilitate communication of the fluid from the third chamber into the tubular member.

27. The apparatus according to claim 25, wherein the tubular member defines a port in an outer surface thereof to facilitate communication of gas from the third chamber and into the tubular member.

28. The apparatus according to claim 27, wherein the port is positioned at an elevated position above an open end of the tubular member to establish a pressure differential between the third chamber and a region of the region of the tubular member at the position of the port.

29. The apparatus according to claim 1, comprising:
an additional plurality of filtration modules each sealingly engaged relative to a respective through hole in the second partition plate; and
a plurality of tubular members each extending from the respective through hole and into the third chamber.

30. The apparatus according to claim 1, wherein the vessel comprises one or more ports to permit fluid communication to and/or from the vessel.

31. The apparatus according to claim 1, wherein an inner diameter of the reducing connector is substantially similar to or smaller than a diameter of the through hole in the first partition plate.

* * * * *